US009736194B1

(12) United States Patent
Rao et al.

(10) Patent No.: US 9,736,194 B1
(45) Date of Patent: Aug. 15, 2017

(54) SYSTEM FOR ESTABLISHING COMMUNICATION BETWEEN DEVICES

(71) Applicant: AMAZON TECHNOLOGIES, INC., Seattle, WA (US)

(72) Inventors: Siddhartha Shankara Rao, Seattle, WA (US); Samuel Rislove Etler, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 14/640,329

(22) Filed: Mar. 6, 2015

(51) Int. Cl.
*H04L 12/66* (2006.01)
*H04L 29/06* (2006.01)

(52) U.S. Cl.
CPC ...... *H04L 65/1069* (2013.01); *H04L 65/1006* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 2001/0056476 A1* | 12/2001 | Benayoun | ........... | H04L 29/1216 709/218 |
| 2009/0300189 A1* | 12/2009 | Takeda | ................... | H04L 67/14 709/227 |
| 2011/0072144 A1* | 3/2011 | Fikouras | ............. | H04L 65/1016 709/230 |
| 2012/0023238 A1* | 1/2012 | Bouthemy | .......... | H04L 65/1016 709/227 |
| 2012/0163371 A1* | 6/2012 | Kitazawa | ............ | H04L 65/1046 370/352 |
| 2013/0156168 A1* | 6/2013 | Lingam | ............. | H04M 1/72563 379/88.16 |
| 2013/0251136 A1* | 9/2013 | Simoes | ............... | H04M 3/5191 379/265.09 |
| 2014/0333713 A1* | 11/2014 | Shoemake | .......... | H04L 65/1069 348/14.05 |
| 2015/0029296 A1* | 1/2015 | Ni | .......................... | H04N 7/148 348/14.01 |

* cited by examiner

*Primary Examiner* — Brian D Nguyen
*Assistant Examiner* — Hashim Bhatti
(74) *Attorney, Agent, or Firm* — Lindauer Law, PLLC

(57) ABSTRACT

Described are techniques for establishing communication between multiple devices. Responsive to a request received from a first device, connection data associated with one or more other devices may be accessed to determine whether the other devices may be accessed via a HTTP connection or a SIP connection. Parameters of the communication may also be determined from the request. Based on configuration data determined from the devices, communication data received from the first device may be transcoded for receipt by other devices, and data received from other devices may be transcoded for receipt by the first device. Web data unrelated to communications between devices may be passed to a web server.

20 Claims, 8 Drawing Sheets

SYSTEM FOR ESTABLISHING COMMUNICATION BETWEEN DEVICES

BACKGROUND

Communications between two or more parties may include use of different types of devices, different device configurations, different communication protocols, and different types of connections.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
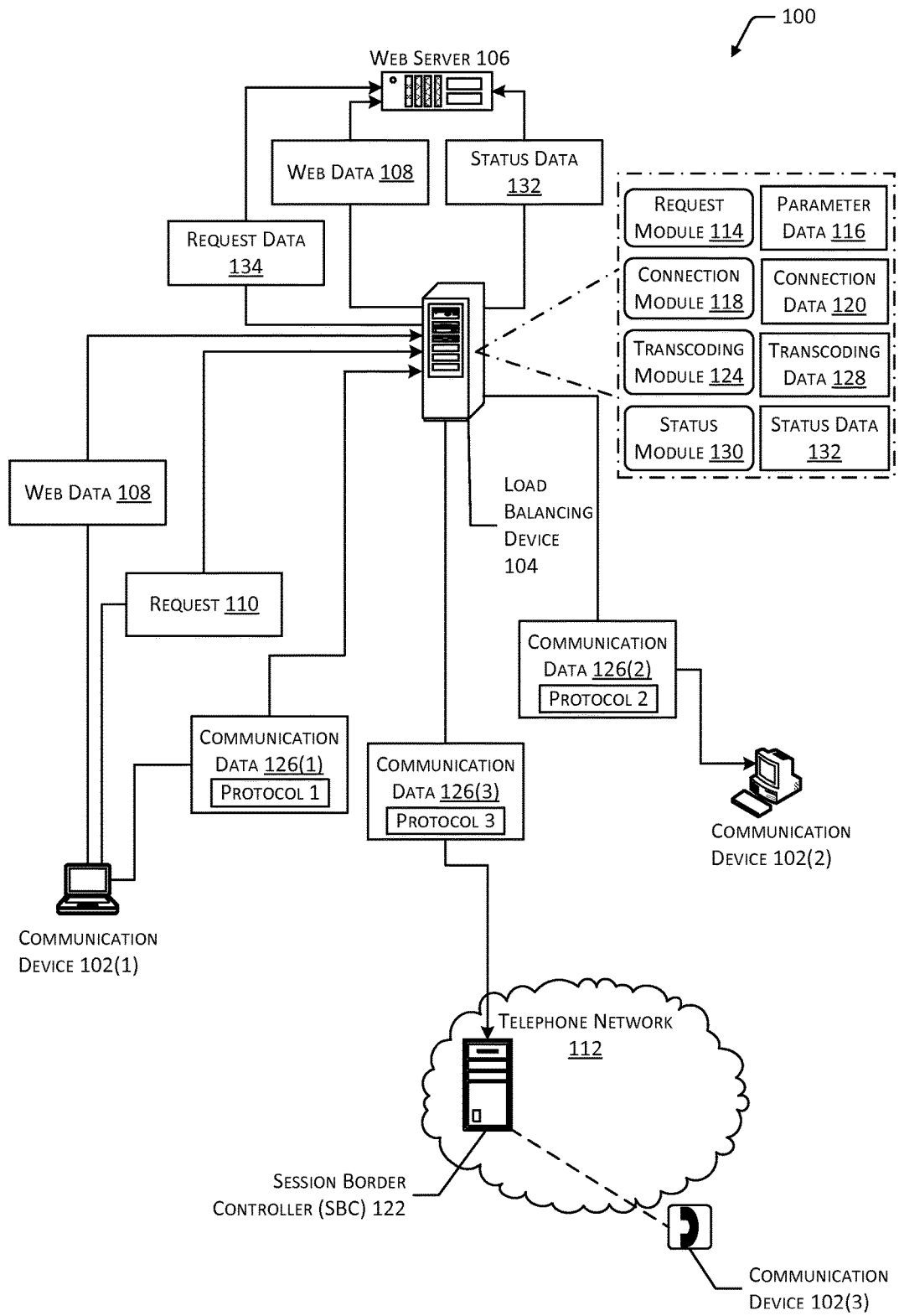
FIG. 1 depicts a system for establishing communications between multiple communication devices using a load balancing device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Communication between two or more devices may include the transmission of data directly between the devices, such as a peer-to-peer communication, or use of an intermediate device, such as a web server, to relay data between other devices. For example, a firewall or other impediments to direct communication may prevent peer-to-peer communications between two devices while permitting communications routed through a server or other computing device. To initiate a media communication that includes the transmission of audio and video data between devices, a Session Description Protocol (SDP) for each device may be determined. The SDP may include indications of firewall settings, open ports, codecs used, and so forth, to enable communications to be provided in a manner that may be successfully received and processed by a receiving device. Many communications occur between disparate types of devices, such as a computing device executing a browser-based application and a telephone or video conferencing device associated with a Private Branch Exchange (PBX), the Public Switched Telephone Network (PSTN), or another type of network. Communications between disparate devices may occur using different protocols, different configurations (e.g., firewall settings, open ports, codecs used), and different types of connections. For example, a browser-based application may communicate with a web server using a Hypertext Transfer Protocol (HTTP) or websocket connection. A Voice over Internet Protocol (VoIP) telephone may communicate using a Session Initiation Protocol (SIP) connection over a telephone network. Communication between a first device associated with a web server and a second device associated with a telephone network may be facilitated using a web server or similar intermediate device. However, it may be challenging to configure a web server to receive and transcode disparate types of input while also communicating other network traffic.

Described in this disclosure are techniques for establishing communication between two or more devices that may include use of a load balancing device that receives data provided to and received from a web server. In one implementation, a first device may be associated with a web server, such as a computing device accessing a network using a browser-based interface or similar application. A second device may be associated with a telephone network, such as a VoIP telephone associated with a PBX or PSTN. To initiate communication between the first and second devices, a request may be provided from one of the devices to the load balancing device. The request may include an identifier associated with the other device. The load balancing device may access connection data that includes identifiers of devices associated with the web server. For example, the connection data may include a state table listing devices that currently have an open HTTP or websocket connection with the web server. If correspondence between the identifier of the target device and the connection data is determined, the load balancing device may establish a connection with the second device via the web server (e.g., using a HTTP or websocket connection to access a browser or similar interface of the target device).

If a lack of correspondence between the identifier of the target device and the connection data is determined, this determination may indicate that the target device is associated with a network remote from the device initiating the communication, such as a telephone network. To communicate with the target device, one or more of a SIP connection or a Real-time Transport Protocol (RTP) connection may be established with a device associated with the telephone network, such as a switch, a session border controller (SBC), and so forth. In some implementations, the request provided to the load balancing device may include data that may be used to generate a SIP invitation, such as header information for a SIP invitation to be provided to the telephone network.

The load balancing device may determine configurations associated with the first and second devices. For example, the load balancing device may determine a SDP for each device. Continuing the example, each device may communicate using a particular protocol, such as HTTP, User Datagram Protocol (UDP), Transmission Control Protocol (TCP), and so forth. Each device may have one or more associated firewall settings, one or more open ports, one or more available channels, and so forth. Each device may use one or more particular codecs to process received data. Based on the configurations of the first and second devices, the load balancing device may receive communication data from a first device that corresponds to a first set of configurations, transcode the communication data to correspond to a second set of configurations, and provide the communication data to the second device. Data received from the second device may similarly be transcoded and provided to the first device.

The load balancing device may therefore serve as an intermediate device through which communications between other devices, including disparate devices, may be routed. Use of the load balancing device to process and relay communication data may enable a web server to be used primarily to route web data (e.g., network traffic). In some implementations, the load balancing device may provide the web server with status data relating to the status of one or more communications, connections, devices, applications, and so forth. For example, the load balancing device may determine the status of a browser-based application executing on a communication device and provide data indicative of the status to the web server. As another example, the load balancing device may provide data indicative of successful and failed communications to the web server for the purpose of calculating metric information.

In some implementations, web data provided to a web server by a communication device and web data received from the web server for transmission to the communication device may be routed through the load balancing device. A browser-based application that communicates with a single device (e.g., the load balancing device) may provide greater security than an application that communicates with multiple devices. The load balancing device may be configured to identify communication requests and communication data, such as by determining one or more terms or parameters within the data received from a device. If the load balancing device determines that received data does not contain terms or parameters relating to establishment of a communication, the load balancing device may provide the data from the communication device to the web server. Similarly, data received from the web server may be provided to the communication device.

Implementations described in this disclosure may therefore enable a connection to be established between two or more communication devices without impacting the performance or functionality of a web server. Implementations described in this disclosure may further enable communication to be established between devices that use different protocols or configurations, such as a first device (e.g., a computing device executing a browser-based interface) associated with a web server and a second device (e.g., a VoIP telephone or video conferencing device) associated with a telephone network.

FIG. 1 depicts a system 100 for establishing communications between multiple communication devices 102 using a load balancing device 104. A communication device 102 may include any manner of computing device or telecommunication device, such as a telephone, mobile device, smartphone, set-top box, tablet computer, personal computer, wearable computer, and so forth. The load balancing device 104 may include any manner of computing device, such as a server, mobile device, smartphone, set-top box, tablet computer, personal computer, wearable computer, and so forth.

A first communication device 102(1) and a second communication device 102(2) may be associated with a web server 106. For example, the first communication device 102(1) and the second communication device 102(2) may communicate with one or more of the load balancing device 104 or the web server 106 via a HTTP or websocket connection. Web data 108 may be provided from the web server 106 to the communication devices 102 and from the communication devices 102 to the web server 106, via the load balancing device 104. For example, the web data 108 may include any type of data associated with the Internet or another network, such as data used to display a web page on the first communication device 102(1) and data indicative of an interaction with the web page by a user of the first communication device 102(1). Web data 108 may include any data received by the communication devices 102 or the web server 106 that is not related to establishing a communication session between communication devices 102. The web data 108 may be routed through the load balancing device 104 so that the communication devices 102 may maintain an open HTTP or websocket connection with only a single device, the load balancing device 104.

To initiate a communication with one or more other communication devices 102, the first communication device 102(1) may provide a request 110 to initiate the communication to the load balancing device 104. For example, the first communication device 102(1) may provide a request 110 to initiate communication with the second communication device 102(2), which is associated with the web server 106, and a third communication device 102(3), which is associated with a telephone network 112. In other implementations, communications may be initiated by other communication devices 102. For example, a request 110 may be provided by one or more of the second communication device 102(2) or the third communication device 102(3). The request 110 may include one or more identifiers associated with the first communication device 102(1) and one or more identifiers associated with the other communication devices 102 that are the target of the communication initiated by the first communication device 102(1). For example, the request 110 may include a network identifier (e.g., an alphanumeric string) associated with the second communication device 102(2) and a telephone number associated with the third communication device 102(3). In some implementations, the request 110 may also include configuration data indicative of one or more configurations of the first communication device 102(1). For example, the first communication device 102(1) may provide a SDP or similar configuration information to the load balancing device 104 indicative of protocols, codecs, channels, ports, firewalls, and so forth, associated with the first communication device 102(1). In other implementations, configuration data associated with the first communication device 102(1) may be determined by the load balancing device 104 or stored in a data store associated with the load balancing device 104.

A request module 114 associated with the load balancing device 104 may process the request 110. The request module 114 may access parameter data 116, which may be used to identify the request 110 and differentiate the request 110 from web data 108 received from the first communication device 102(1). For example, the request 110 may include data provided in a JavaScript Object Notation (JSON) format, or another type of format, from which one or more terms (e.g., alphanumeric strings) associated with a communication may be identified. The parameter data 116, described in greater detail with regard to FIG. 2, may include a map, table, list, database, or other type of data structure indicative of one or more terms that may be associated with a communication. The request module 114 may determine correspondence between the request 110 and at least a portion of the parameter data 116. The corresponding terms may be used to determine one or more parameters of the request 110, the type of connection that may be used to initiate the communication, the first communication device 102(1), other communication devices 102, and so forth. For example, the request module 114 may determine parameters such as header information for a SIP invitation, one or more protocols, codecs, or other configurations, and so forth, from the request 110.

The request module 114 may also differentiate requests 110 received by the load balancing device 104 from web data 108. Web data 108 received by the load balancing device 104 from the first communication device 102(1) or the web server 106 would generally not include terms found in the parameter data 116. For example, the parameter data 116 may include one or more words or alphanumeric strings, each of which may correspond to a possible parameter of a communication. The terms contained within the parameter data 116 may include arbitrary or random strings unlikely to be found in web data 108. A request 110 may include one or more of such terms, while web data 108 would most likely lack any terms of the parameter data 116. The request module 114 may determine a lack of correspondence between the web data 108 and the parameter data 116. Responsive to this determination, the load balancing device 104 may provide the web data 108 to the web server 106 or to one or more of the communication devices 102.

In some implementations, the request 110 may include additional data other than portions corresponding to the parameter data 116. For example, the request 110 may include text, scripts, graphical elements, and so forth, that are associated with the connection but are not used to define parameters of the connection. Portions of the request 110 that do not correspond to the parameter data 116 may be provided to the web server 106. For example, the load balancing device 104 may pass information such as a picture of the user, geolocation of the communication device 102, an identification of users or communication devices 102 participating in a communication, a type of connection, and so forth, to the web server 106. In some implementations, the portions of the request 110 that correspond to the parameter data 116 may also be provided to the web server 106 to indicate a status of a connection, the communication devices 102 associated with the connection, and so forth.

A connection module 118 associated with the load balancing device 104 may establish connections with one or more communication devices 102. The connection module 118 may access connection data 120, which may include one or more identifiers of one or more communication devices 102. For example, the connection data 120 may include a table or list indicating one or more communication devices 102 having a HTTP or websocket connection with the load balancing device 104 or another type of network association with the load balancing device 104 or the web server 106. When correspondence is determined between the connection data 120 and an identifier of a communication device 102 determined from the request 110, this determination may indicate that the communication device 102 may be accessed using a HTTP or websocket connection. When a lack of correspondence between the connection data 120 and an identifier in the request 110 is determined, this determination may indicate that the communication device 102 is not accessible via a HTTP or websocket connection, and that a different type of connection, such as a SIP connection, may be used to access the communication device 102. For example, the second communication device 102(2) may be associated with the load balancing device 104 and the web server 106 by a HTTP or websocket connection. The connection module 118 may therefore establish a HTTP or websocket connection between the load balancing device 104 and the second communication device 102(2). The third communication device 103(3) may instead be associated with the telephone network 112, and may not be accessible to the load balancing device 104 via a HTTP or websocket connection. In some implementations, to establish communication between each of the first communication device 102(1), the second communication device 102(2), and the third communication device 102(3), the connection module 118 may access or initiate a multipoint control unit (MCU). A MCU may be used to bridge videoconferencing sessions or other exchanges of audio or video content between communication devices 102. A MCU may include a device associated with an endpoint within a network that may be accessed by three or more connections (e.g., terminals or gateways). For example, a MCU may include one or more multipoint controllers or multipoint processors.

The connection module 118 may establish one or more of a SIP connection or a RTP connection with a session border controller (SBC) 122, or another type of device (e.g., a switch, server, computing device, and so forth) associated with the telephone network 112. The SIP or RTP connection may be used to communicate with the third communication device 102(3). For example, the third communication device 102(3) may be integrated within the telephone network 112 and may receive data from the SBC 122 or other devices in the telephone network 112. In other implementations, the third communication device 102(3) may be external to the telephone network 112 and may receive data from a device associated with the endpoint of the SIP or RTP connection. For example, the third communication device 102(3) may include a telephone associated with a cable-based network that communicates with the device at the endpoint of the SIP or RTP connection. A SIP connection may include a connection established using the protocol(s) standardized under request for comments (RFC) 3261 in 2002 by the Internet Engineering Task Force (IETF). A SIP connection may also be established according to one or more of RFC 2543 (published by the IETF in 1999) and RFC 3262 (published by the IETF in 2002). A RTP connection may include a connection established according to RFC 3550, published in 2003 by the IETF. A RTP connection may also be established according to RFC 1889 (published in 1996 by the IETF).

As described previously, the request module 114 may determine parameters associated with a communication from the request 110, based at least in part on correspondence between the request 110 and the parameter data 116. The connections established by the connection module 118 may be determined at least partially based on the parameters determined by the request module 114. For example, parameters determined from the request 110 may be used by the connection module 118 to generate a SIP invitation to be provided to the telephone network 112. Continuing the example, a SIP invitation may include a "To" field, a "From" field, a "Request-Line-URI" field, a "Via" field, a "Contact" field, an "Allow" field, and so forth. Parameters corresponding to one or more fields of the SIP invitation may be determined from the request 110. Similar information from the request 110 may be determined for other types of connections, such as HTTP or websocket connections.

A transcoding module 124 associated with the load balancing device 104 may be used to transcode communication data 126 received from one or more of the communication devices 102, based on the configurations and protocols associated with the communication devices 102 associated with a particular communication. For example, the transcoding module 124 may convert the communication data 126 from a first encoding scheme or format associated with a communication device 102 providing the communication data 126 to a second encoding scheme or format associated with a communication device 102 receiving the communication data 126. Continuing the example, the transcoding module 124 may determine a SDP or other configuration data from one or more of the first communication device 102(1), the second communication device 102(2), or the third communication device 102(3). Configuration data may include protocols used by one or more of the communication devices 102, such as HTTP, UDP, TCP, SIP, RTP, and so forth. Configuration data may also include ports, channels, firewall settings, and so forth, associated with one or more communication devices 102. Configuration data may also include data indicative of one or more codecs used by one or more of the communication devices 102 to encode or compress data for transmission and to decode received data. In some implementations, configuration data associated with one or more communication devices 102 may be determined from the request 110. In other implementations, configuration data associated with one or more communication devices 102 may be determined by the transcoding module 124 from the communication devices 102. For example, the transcoding module 124 may query one or more of the communication devices 102 to determine configuration data from the devices. In still other implementations, configuration data associated with one or more communication devices 102 may be stored in a data store associated with the load balancing device 104 for future access when transcoding data to be provided to the communication devices 102. For example, the connection data 120 may include a SDP or other configuration data associated with one or more communication devices 102.

The transcoding module 124 may receive and process communication data 126 from one or more communication devices 102 and transcode the communication data 126 based on the configurations associated with other communication devices 102. The transcoded communication data 126 may then be provided to the other communication devices 102. For example, the first communication device 102(1) may provide first communication data 126(1) to the load balancing device 104 using a first protocol. Based at least partially on the configurations associated with the second communication device 102(2) the transcoding module 124 may transcode the first communication data 126(1) to form second communication data 126(2) associated with a second protocol. Based at least partially on the configurations associated with the third communication device 102(3), the transcoding module 124 may transcode the first communication data 126(1) to form third communication data 126(3) associated with a third protocol. The second communication data 126(2) may be provided to the second communication device 102(2) via the HTTP or websocket connection. The third communication data 126(3) may be provided to the third communication device 102(3) via the SIP or RTP connection. The transcoding module 124 may access transcoding data 128 stored in association with the load balancing device 104, which may be used to facilitate transcoding of the communication data 126 based on determined protocols and other configurations.

In some implementations, the communication data 126 may include one or more of alphanumeric data, image data, audio data, or video data. For example, the load balancing device 104 may be used to initiate a VoIP or Voice over Long Term Evolution (VoLTE) communication between communication devices 102. In other implementations, the load balancing device 104 may be used to initiate a video conference session between communication devices 102. Continuing the example, the first communication data 126(1) may include one or more of audio data or video data generated using one or more codecs associated with the first communication device 102(1). The codecs associated with the first communication device 102(1) may not be used by one or more of the other communication devices 102. For example, certain communication devices 102 or certain applications executed by the communication devices 102 may be incompatible with one or more codecs. The transcoding module 124 may transcode the first communication data 126(1) to produce communication data 126 associated with other codecs that may be processed by the other communication device(s) 102.

A status module 130 associated with the load balancing device 104 may be used to determine status data 132 associated with one or more of the communication devices 102, connections with the communication devices 102, communications executed by the communication devices 102, applications (e.g., browsers) executed by the communication devices 102, and so forth. For example, the web server 106 may request status data 132 from the load balancing device 104 regarding one or more of the communication devices 102. The load balancing device 104 may determine status data 132 by querying one or more of the communication devices 102 or by accessing stored status data 132 associated with the communication devices 102. Status data 132 may include historic or aggregated data regarding previous communications. In some implementations, the status data 132 may include metric information regarding one or more communications. For example, metric information may include a count of attempted communications that were successful, a count of failed communications, and so forth. Metric information may also include a total count of communications over a time period, a current number of active communications, a state of one or more communications, and so forth.

In some implementations, one or more of the status module 130, the request module 114, or the connection module 118 may provide request data 134 indicative of the request 110 to the web server 106. As described previously, the request 110 may include additional data other than portions corresponding to the parameter data 116, such as text, scripts, graphical elements, and so forth, that are associated with the connection but are not used to define parameters of the connection. One or more of those portions of the request 110 may be provided to the web server 106 as the request data 134.

Figure 2:
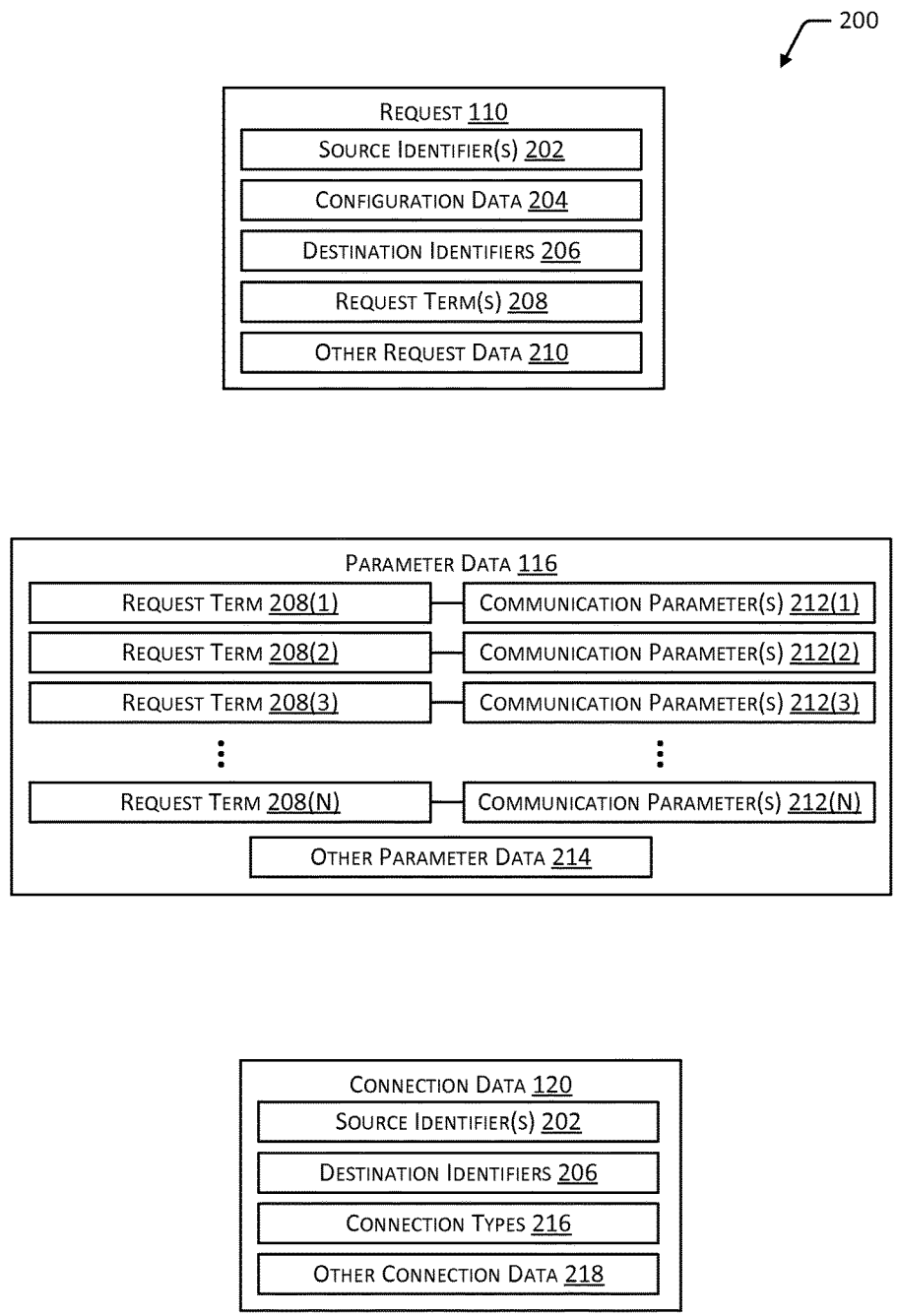
FIG. 2 is a block diagram illustrating examples of requests, parameter data, and connection data.

FIG. 2 is a block diagram 200 illustrating examples of requests 110, parameter data 116, and connection data 120.

A request 110 may include data provided to the load balancing device 104 by a communication device 102 to initiate a communication with one or more other communication devices 102. The request 110 may include one or more source identifiers 202 indicative of the communication device 102 providing the request 110 or one or more characteristics of the communication device 102. For example, source identifiers 202 may include signed credentials, digital certifications, registration keys, and so forth, indicative of the communication device 102 providing the request 110. In other implementations, source identifiers 202 may include alphanumeric data indicative of the communication device 102, a type of device associated with the communication device 102, one or more applications associated with the communication device 102, a type of connection associated with the communication device 102, and so forth. In some implementations, the source identifier(s) 202 may be used to verify the authenticity of the request 110. For example, the request module 114 may access the connection data 120 or other data indicative of source identifiers 202 associated with communication devices 102 that may provide requests 110 to the load balancing device 104. If the source identifiers 202 of the connection data 120 are determined to correspond to the source identifiers 202 of the request 110, this determination may indicate the authenticity of the request 110. As described previously, the source identifier(s) 202 may also be used to determine information used to establish connections with other communication devices 102. For example, the source identifier(s) 202 may be used to populate the "From" field of a SIP invitation.

In some implementations, the request 110 may include configuration data 204 associated with the communication device 102 providing the request 110. For example, the communication device 102 may provide, to the load balancing device 104, a SDP or other information regarding ports, channels, firewalls, codecs, protocols, and so forth, associated with the communication device 102. In other implementations, configuration data 204 associated with the communication device 102 may be determined from the communication device 102 by the load balancing device 104. For example, the load balancing device 104 may query one or more communication devices 102 to determine configuration data 204. In still other implementations, configuration data 204 associated with the communication device 102 may be stored in association with the load balancing device 104. Stored configuration data 204 may be accessed to establish connections and provide data to the communication device 102. For example, the connection data 120 may include configuration data 204 associated with one or more communication devices 102. The configuration data 204 may be used, for example, by the connection module 118 to determine a type of connection to establish with the communication device 102. The configuration data 204 may also be used by the transcoding module 124 to determine one or more protocols, codecs, or other configurations to be applied to communication data 126 provided to the communication device 102.

The request 110 may also include one or more destination identifiers 206. The destination identifiers 206 may include data indicative of one or more communication devices 102 to which a communication is targeted. For example, a request 110 may include a network address of a communication device 102 having a HTTP or websocket connection with the load balancing device 104. In other implementations, a request 110 may include a telephone number or a similar identifier that may be used to establish communication with a communication device 102 associated with a telephone network 112. The connection module 118 may determine correspondence between the destination identifiers 206 of the request 110 and the connection data 120. This correspondence may be used to determine the type of connection to establish with a communication device 102. The destination identifier(s) 206 may also be used to determine information used to establish connections with the associated communication devices 102. For example, the destination identifier(s) 206 may be used to populate the "To" field of a SIP invitation.

The request 110 may additionally include one or more request terms 208. The request terms 208 may include data provided in a JSON format or another type of format from which one or more selected strings of data, such as alphanumeric strings, may be identified by the request module 114. The request terms 208 may be provided using a format, protocol, or other configurations associated with the communication device 102 providing the request 110. The request module 114 may be used to identify the request 110 and differentiate the request 110 from web data 108 by determining correspondence between the request terms 208 and parameter data 116. As described previously and in greater detail below, the parameter data 116 may include a map, table, list, database, or other type of data structure indicative of one or more request terms 208, which may be mapped to parameters associated with the communication. As described previously, the parameter data 116 may include one or more request terms 208, at least a portion of which may correspond to parameters of the communication. By determining the presence of one or more request terms 208 within the request 110, the request module 114 may differentiate the request 110 from web data 108. The web data 108 may lack request terms 208 found in the parameter data 116. In some implementations, the request terms 208 may be selected to include terms unlikely to occur in web data 108, such as arbitrarily or randomly selected alphanumeric strings. For example, the request term 208 "batterystaple" may correspond to a parameter to create a communication session, add a participant, remove a participant, and so forth.

Other request data 210 may include data indicative of characteristics of the communication device 102 providing the request 110, networks or other devices associated with the communication device 102, and so forth. Other request data 210 may further include configuration data 204 associated with other communication devices 102 toward which the communication is targeted. In some implementations, other request data 210 may include one or more identifiers that identify the request 110 to the load balancing device 104 independent of particular request terms 208. In other implementations, the other request data 210 may include portions of the request 110 that do not correspond to parameters of the connection, such as the request data 134. Those portions of the request 110 that do not correspond to the parameter data 116 may be provided to the web server 106.

Parameter data 116 may be used by the request module 114 to identify the request 110 and differentiate the request 110 from web data 108. Parameter data 116 may also be used to determine one or more communication parameters 212 associated with a communication to be established responsive to the request 110. For example, the parameter data 116 may include a map, table, list, database, or other type of data structure that associates one or more request terms 208 with one or more communication parameters 212. As described previously, the request 110 may include data provided in a JSON format, or another type of format, from which one or more request terms 208 may be determined. The request terms 208 may include alphanumeric strings or other types of data, one or more of which may be associated with one or multiple communication parameters 212. For example, a first request term 208(1) may be associated with one or more first communication parameters 212(1). Continuing the example, a request 110 that includes an arbitrary alphanumeric request term 208, such as "batterystaple," followed by a destination identifier 206, may be received and processed by the request module 114. The parameter data 116 may indicate that the request term 208 is associated with a communication parameter 212 to create a communication session with the communication device 102 associated with the destination identifier 206. For example, the parameter data 116 may include a map, table, or another type of data structure which associates particular request terms 208 with particular communication parameters 212.

In a similar manner, a second request term 208(2) may be associated with one or more second communication parameter(s) 212(2), and a third request term 208(3) may be associated with one or more third communication parameter(s) 212(3). Any number of additional request terms 208(N) may be associated with any number of additional communication parameters 212(N). In some implementations, a single request term 208 may have a single communication parameter 212 or multiple communication parameters 212 associated therewith. For example, a single request term 208 may correspond to a first communication parameter 212 to create a communication session, and a second communication parameter 212 to add a participant identified in the request 110. In other implementations, multiple request terms 208 may be associated with a single communication parameter 212. For example, two arbitrary alphanumeric strings may both correspond to deleting a participant from a communication session.

In some implementations, one or more request terms 208 may map to communication parameters 212 for joining a communication session, leaving a communication session, passing a communication session identifier, adding a participant to a communication session, removing a participant from a communication session, and so forth. In one implementation, the communication parameters 212 may include a Representational State Transfer (REST) interface. For example, a request term 208 may include a JSON or extensible markup language (XML) key, which is mapped to a particular REST Application Programming Interface (API). Use of a REST interface may enable communication devices 102 to access and interact with the load balancing device 104 independent of the structure of the API. Receipt of a request 110 that includes a particular request term 208 may result in the invocation of a corresponding REST API. In other implementations, the communication parameters 212 may include other types of interfaces, such as Simple Object Access Protocol (SOAP), may be used.

In some implementations, communication parameters 212 may include characteristics of a connection to be established. For example, one or more request terms 208 may include information to be provided into header fields of a SIP invitation. The request terms 208 may be associated with communication parameters 212 indicative of the header fields into which data may be provided.

Other parameter data 214 may include alternate sets of request terms 208. For example, a first request term 208(1) received from a first communication device 102(1) may correspond to a particular communication parameter 212 for initiating a communication with a second communication device 102(2). The first request term 208(1) may be provided using a format, protocol, or other configurations associated with the first communication device 102(1). A second communication device 102(2) may provide a second request term 208(2), different from the first request term 208(1), that corresponds to a format, protocol, or other configurations associated with the second communication device 102(2). The second request term 208(2) may still be associated with the same communication parameter 212, for initiating a communication with another communication device 102, that is associated with the first request term 208(1). The parameter data 116 may therefore be used as a bidirectional map for receiving request terms 208 from multiple parties associated with a communication.

In some implementations, the request module 114 may receive a request 110 from the first communication device 102(1) executing a browser-based interface, via a HTTP or websocket connection. The request terms 208 may be mapped to communication parameters 212 for generating a SIP invitation to be provided to a telephone network 112 associated with the third communication device 102(3). In other implementations, the request module 114 may be configured to process requests 110 received from the third communication device 102(3). Continuing the example, a request 110 provided from the third communication device 102(3) (e.g., using SIP, RTP, UDP, or similar protocols) may include different request terms 208 that may be mapped to communication parameters 212 for establishing a HTTP or websocket connection with the first communication device 102(1).

Other parameter data 214 may also include encryption keys and schemes. Other parameter data 214 may further include templates and formats for generation of SIP invitations and similar correspondence associated with communications.

Connection data 120 may be used by the connection module 118 to determine a type of connection for communicating with one or more communication devices 102. For example, the connection data 120 may include indications of one or more communication devices 102 accessible to the load balancing device 104 using a HTTP or websocket connection. A communication device 102 that is not indicated in the connection data 120 may be inaccessible via a HTTP or websocket connection, and a SIP connection or another type of connection may be used to establish communication with the communication device 102.

The connection data 120 may include one or more source identifiers 202 and one or more destination identifiers 206. The source identifiers 202 and destination identifiers 206 may include signed credentials, digital certifications, registration keys, alphanumeric data, or other types of data indicative of a communication device 102 associated with the source identifier 202 or destination identifier 206. For example, a source identifier 202 or destination identifier 206 may include a registration number or name associated with a communication device 102. The source identifiers 202 and destination identifiers 206 may be stored in any manner of list, table, database, and so forth, that may be queried by the connection module 118. When the load balancing device 104 receives a request 110 that includes one or more destination identifiers 206, the connection module 118 may determine correspondence between the request 110 and the connection data 120 by querying the connection data 120 for source identifiers 202 or destination identifiers 206 that correspond to the request 110. For example, the connection data 120 may include a state list of one or more communication devices 102 for which an open websocket connection exists with the load balancing device 104. If correspondence between the request 110 and the connection data 120 is determined, the communication device 102 associated with the source identifier 202 or destination identifier 206 may be accessed using a HTTP or websocket connection. If a lack of correspondence between the request 110 and the connection data 120 is determined, a different type of connection, such as one or more of a SIP connection or a RTP connection, may be used to establish communication with the communication device 102.

In some implementations, the connection data 120 may include one or more connection types 216. For example, one or more source identifiers 202 or destination identifiers 206 may be stored, in a data store, in association with a corresponding connection type 216. When a request 110 that includes a particular source identifier 202 or destination identifier 206 is received, a connection having the corresponding connection type 216 may be established between the communication device 102 associated with the received identifier and the load balancing device 104. Continuing the example, the connection types 216 stored in association with the identifiers may be used to determine the nature of the connection established with the corresponding communication device 102 in addition to or in place of the configuration data 204 corresponding to the communication device 102.

Other connection data 218 may include protocols, channels, or ports associated with source identifiers 202, destination identifiers 206, or connection types 216. Other connection data 218 may also include encryption schemes, keys, and so forth. Other connection data 218 may further include request terms 208 or other data that may be used to establish connections, such as information for populating a header of a SIP invitation, or similar information for generating other types of connections. In some implementations, other connection data 218 may include configuration data 204 associated with one or more communication devices 102. For example, the configuration data 204 may be used by the connection module 118 to determine a type of connection to establish with one or more communication devices 102.

Figure 3:
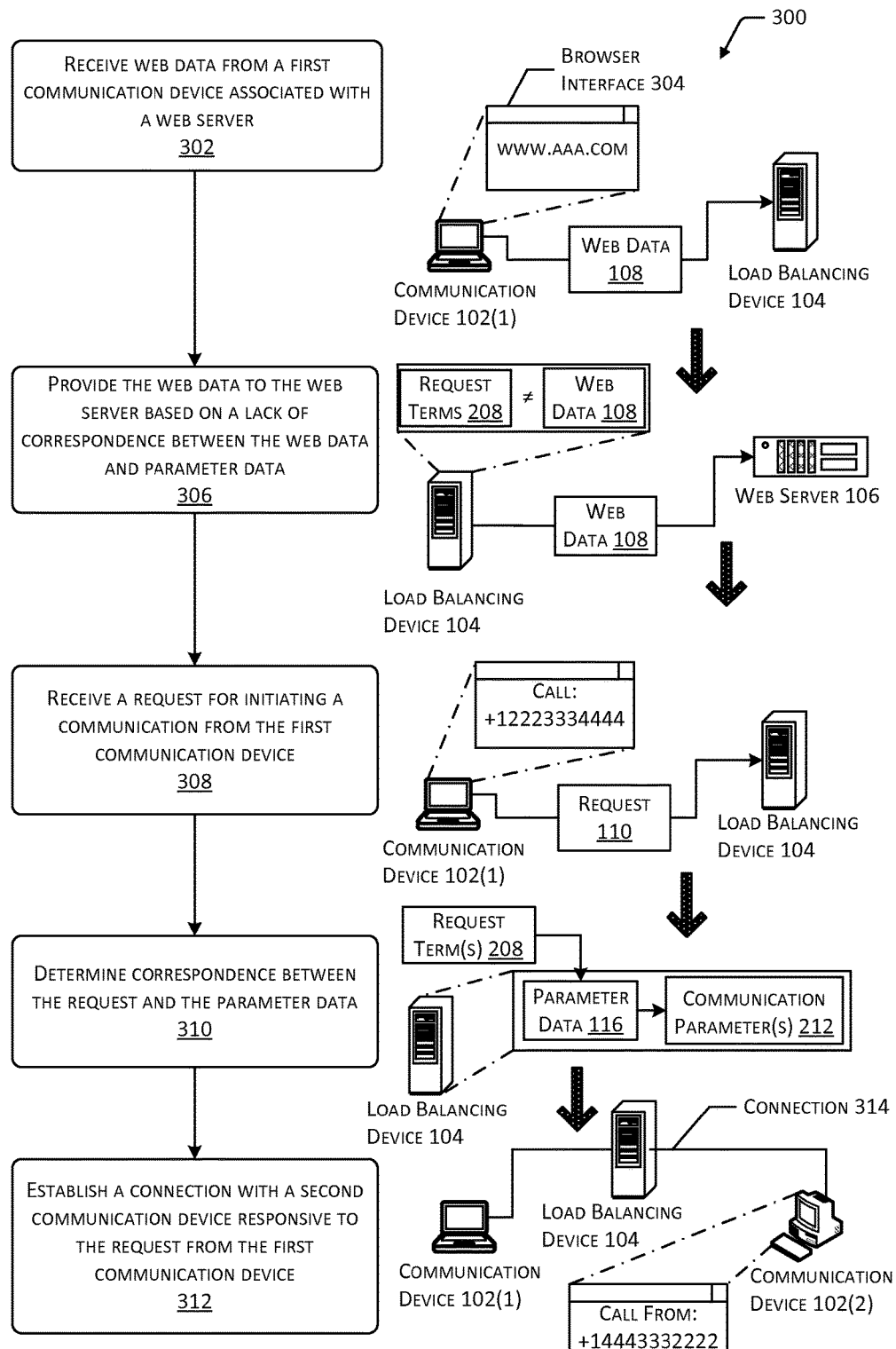
FIG. 3 illustrates a method for determining a request from a first communication device and establishing a connection with a second communication device responsive to the request.

FIG. 3 illustrates a method 300 for determining a request 110 from a first communication device 102(1) and establishing a connection with a second communication device 102(2) responsive to the request 110. At 302, web data 108 may be received by a load balancing device 104 from a first communication device 102(1) associated with a web server 106. For example, the first communication device 102(1) may be executing a browser interface 304 or one or more other programs or services to display a webpage or output other content associated with a network. The first communication device 102(1) may have a HTTP or websocket connection with the load balancing device 104, which may in turn communicate with the web server 106. Routing the communication of web data 108 to and from the first communication device 102(1) through the load balancing device 104 may enable the first communication device 102(1) to operate with a single open connection and to exchange data with a single device, the load balancing device 104, which may improve security associated with operation of the first communication device 102(1).

At 306, the load balancing device 104 may provide the web data 108 to the web server 106 based on a lack of correspondence between the web data 108 and parameter data 116 stored in association with the load balancing device 104. As described previously with regard to FIG. 1, a request module 114 may attempt to determine correspondence between parameter data 116 and data received from a communication device 102, which may include a request 110, web data 108, or other types of data. The parameter data 116 may include one or more request terms 208, which may be mapped to corresponding communication parameters 212 associated with a request 110 to initiate a communication. The request terms 208 may include arbitrary or random terms that are unlikely to be found in web data 108. Use of such request terms 208 may minimize the likelihood that the web data 108 contains one or more of the request terms 208. The lack of correspondence between the parameter data 116 and the web data 108 may be determined by the absence of one or more request terms 208 within the web data 108. Determination of a lack of correspondence between the parameter data 116 and the web data 108 may indicate that the web data 108 is unrelated to a communication between communication devices 102. Responsive to this determination, the web data 108 may be provided to the web server 106. In a similar manner, web data 108 received by the load balancing device 104 from the web server 106 may also lack one or more response terms 208 and may be provided to the first communication device 102(1).

At 308, the load balancing device 104 may receive a request 110 for initiating a communication from the first communication device 102(1). For example, the request 110 may include a destination identifier 206 associated with one or more other communication devices 102. Continuing the example, the request 110 may include a telephone number (e.g., "+12223334444") for contacting a communication device 102 associated with a telephone network 112. As described previously with regard to FIG. 2, the request 110 may include other data, such as one or more source identifiers 202 indicative of the first communication device 102(1) or configuration data 204 associated with one or more of the first communication device 102(1) or other communication devices 102. The request 110 may also include one or more request terms 208 that may be used to define communication parameters 212 of the communication session to be established.

At 310, correspondence between the request 110 and the parameter data 116 may be determined. For example, the request module 114 may determine one or more request terms 208 from the request 110. One or more request terms 208 from the request 110 may correspond to one or more request terms 208 of the parameter data 116. At least a portion of the corresponding request terms 208 may include one or more associated communication parameters 212. For example, the parameter data 116 may include a map in which various request terms 208 correspond to various communication parameters 212. Each request term 208 in the request 110 that corresponds to a request term 208 in the parameter data 116 may be mapped to an associated communication parameter 212. Continuing the example, a first request term 208(1) may include an alphanumeric string that is mapped to a communication parameter 212 for creating a communication session. A second request term 208(2) may include a string or other type of data that is mapped to a communication parameter 212 for adding a participant (e.g., a second communication device 102(2)) to the communication session. Additional request terms 208 may include data that may be used to populate a header of a SIP invitation or other information that may be provided to the second communication device 102(2).

At 312, the load balancing device 104 may establish a connection 314 with a second communication device 102(2) responsive to the request 110 from the first communication device 102(1). A connection module 118 associated with the load balancing device 104 may access one or more of connection data 120 or the connection parameters 212 determined from the request 110 to determine a type of connection 314 to establish with the second communication device 102(2). For example, the second communication device 102(2) may include a computing device executing a browser-based interface that is accessible to the load balancing device 104 via a HTTP or websocket connection. In other implementations, the second communication device 102(2) may include a telephone or video conferencing device associated with a telephone network 112 and may be accessible to the load balancing device 104 via a SIP or RTP connection.

Figure 4:
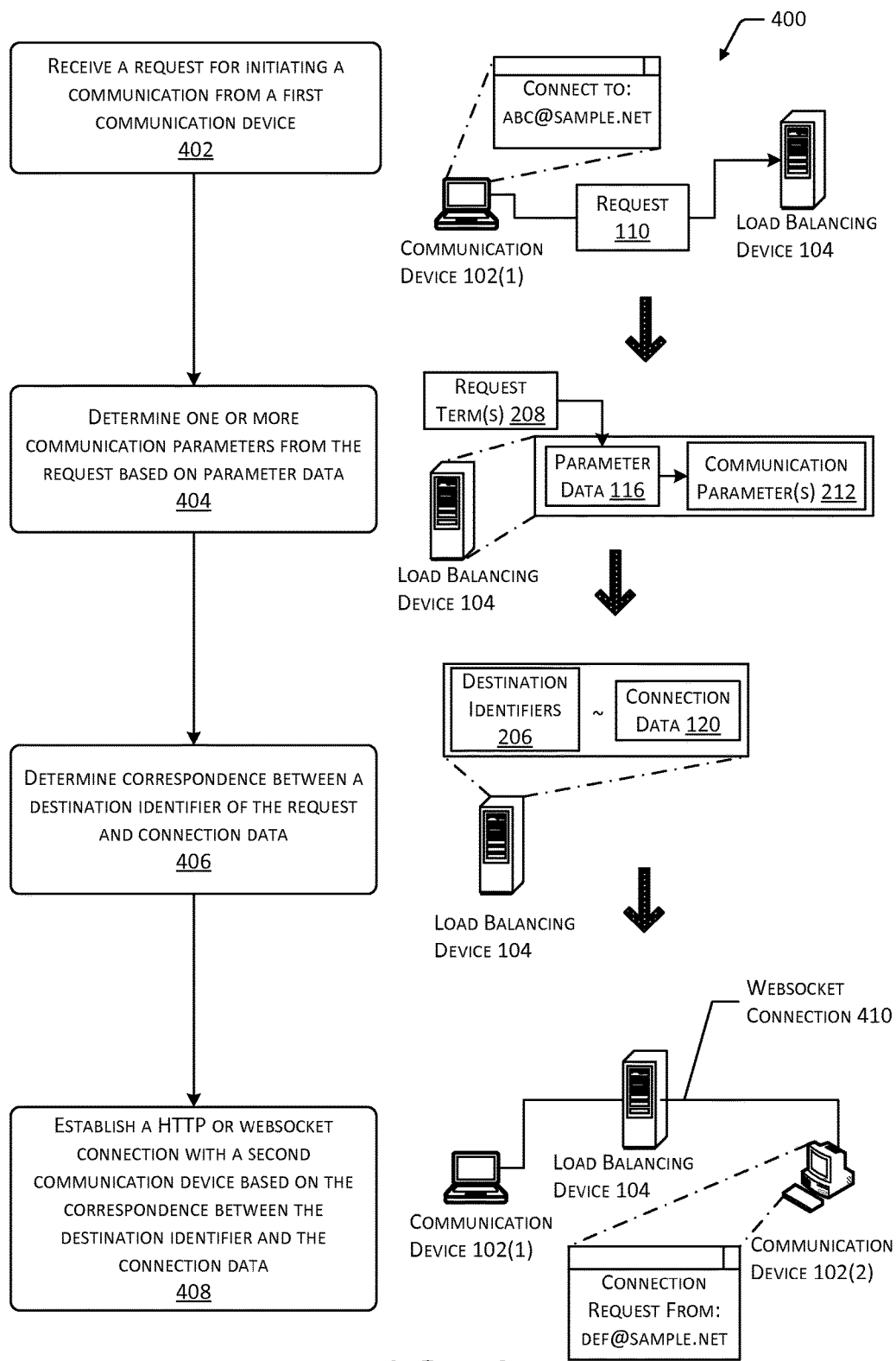
FIG. 4 illustrates a method for establishing a Hypertext Transfer Protocol (HTTP) or websocket connection with a communication device responsive to a request.

FIG. 4 illustrates a method 400 for establishing a HTTP or websocket connection with a communication device 102 responsive to a request 110. At 402, a load balancing device 104 may receive a request 110 for initiating a communication from a first communication device 102(1). As described previously, the request 110 may include one or more destination identifiers 206 corresponding to one or more other communication devices 102. For example, the request 110 may include a name or address (e.g., "abc@sample.net") that may be used to identify a communication device 102 within a network associated with the first communication device 102(1).

At 404, one or more communication parameters 212 may be determined form the request 110 based on parameter data 116. For example, the request module 114 may determine request terms 208 from the request 110, which may be mapped to one or more communication parameters 212 for establishing the communication session. Continuing the example, one communication parameter 212 may include an identifier associated with a communication device 102 with which the communication session is to be established. Other communication parameters 212 may include REST APIs for creating the communication session, adding participants to the communication session, and so forth.

At 406, correspondence between one or more destination identifiers 206 of the request 110 and connection data 120 may be determined. As described previously with regard to FIG. 2, connection data 120 may include one or more destination identifiers 206 that correspond to communication devices 102 associated with a web server 106, a load balancing device 104, or one or more other networks or devices. For example, the connection data 120 may include a state table having identifiers indicative of one or more communication devices 102 having an open HTTP or websocket connection with the load balancing device 104. Correspondence between the destination identifiers 206 of the connection data 120 and those of the request 110 may indicate that communication devices 102 associated with the corresponding destination identifiers 206 may be accessible to the load balancing device 104 via a HTTP or websocket connection.

At 408, the load balancing device 104 may establish a HTTP or websocket connection 410 with a second communication device 102(2) based on the correspondence between the destination identifier 206 and the connection data 120. The load balancing device 104 may then receive communication data 126 from the first communication device 102(1), transcode the communication data 126 if necessary, and provide the communication data 126 to the second communication device 102(2) via the HTTP or websocket connection 410. The load balancing device 104 may also receive communication data 126 from the second communication device 102(2) to be provided to the first communication device 102(1).

Figure 5:
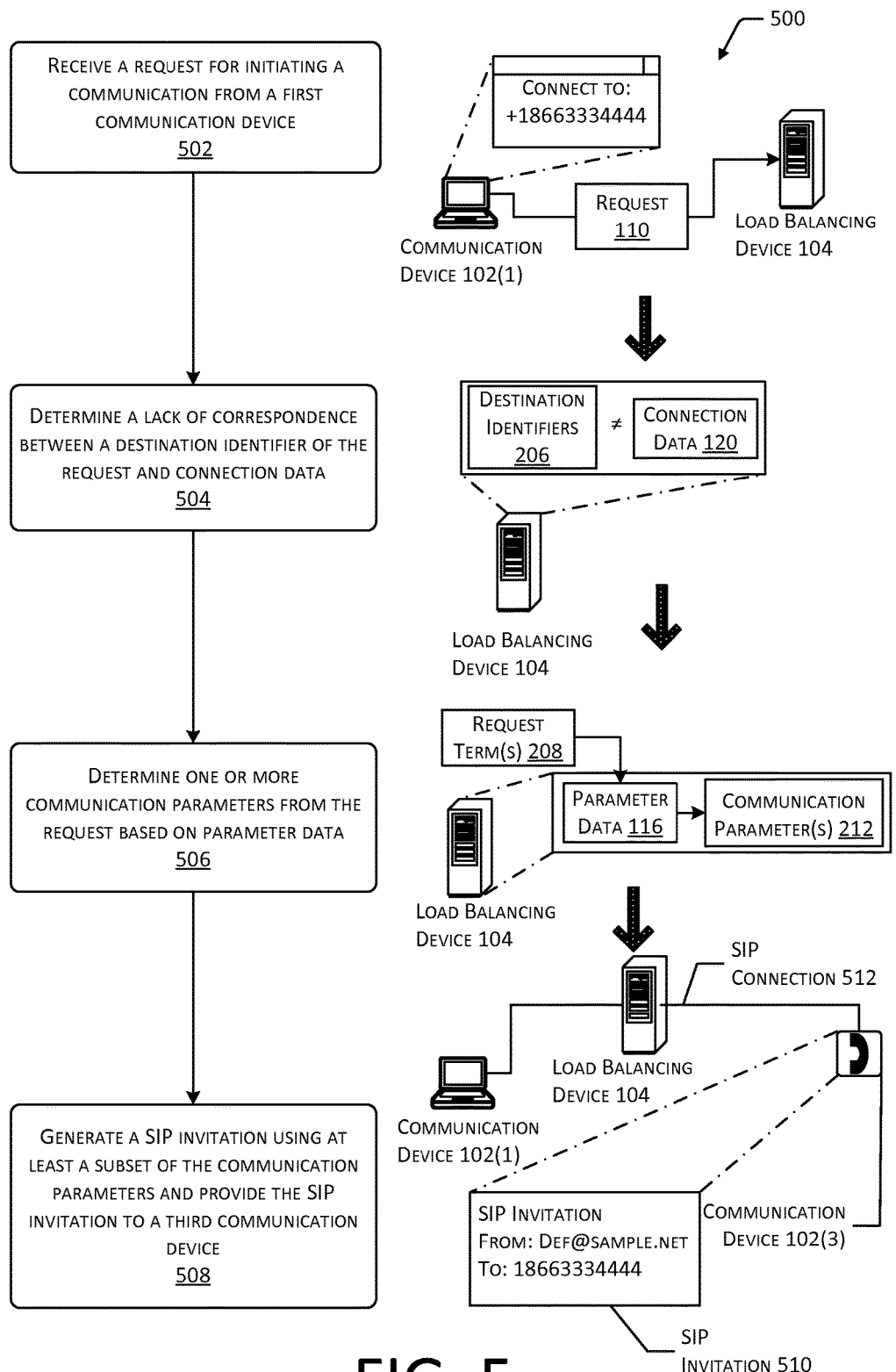
FIG. 5 illustrates a method for establishing a Session Initiation Protocol (SIP) or Real-time Transport Protocol (RTP) connection with a communication device responsive to a request.

FIG. 5 illustrates a method 500 for establishing a SIP or RTP connection with a communication device 102 responsive to a request 110. At 502, a load balancing device 104 may receive a request 110 for initiating a communication from a first communication device 102(1). As described previously, the request 110 may include one or more destination identifiers 206 corresponding to one or more other communication devices 102. For example, the request 110 may include a telephone number (e.g., "+18663334444") or other identifying information or contact information associated with a communication device 102. In some implementations, the communication device 102 may be external to the network with which the first communication device 102(1) is associated. For example, the communication device 102 that is the target of the request 110 may include a telephone or video conferencing device that is associated with a telephone network 112.

At 504, a lack of correspondence between one or more destination identifiers 206 of the request 110 and connection data 120 may be determined. As described previously, connection data 120 may include one or more destination identifiers 206 that correspond to communication devices 102 accessible to the load balancing device 104 via a HTTP or websocket connection 410. A lack of correspondence between destination identifier(s) 206 of the request 110 and the destination identifiers 206 of the connection data 120 may indicate that the communication device 102 to which the request 110 is directed may not be accessible to the load balancing device 104 using a HTTP or websocket connection 410. Determination of the lack of correspondence may indicate that communication with the target communication device 102 may be established using one or more of a SIP connection or RTP connection. In other implementations, the connection data 120 may include one or more destination identifiers 206 that correspond to communication devices 102 accessible to the load balancing device 104 via a SIP connection or a RTP connection. In still other implementations, the connection data 120 may include destination identifiers 206 stored in association with one or multiple connection types 216. For example, the load balancing device 104 may determine a type of connection to initiate with one or more communication devices 102 based on the connection types 216 of the connection data 120.

At 506, one or more communication parameters 212 may be determined from the request 110 based on parameter data 116. For example, the request module 114 may determine request terms 208 from the request 110 that may be mapped to communication parameters 212 for creating the communication session, adding participants to the communication session, and so forth. In some implementations, the request module 114 may also determine request terms 208 that may be mapped to communication parameters 212 for populating one or more header fields of a SIP invitation.

At 508, the load balancing device 104 may generate a SIP invitation 510 using at least a subset of the communication parameters 212 and provide the SIP invitation 510 to the third communication device 102(3). For example, the third communication device 102(3) may include a VoIP or VoLTE telephone or a video conferencing device associated with a telephone network 112. Communication parameters 212 determined from the request 110 may be used to generate the SIP invitation 510. For example, a source identifier 202 associated with the first communication device 102(1) may be used to determine a communication parameter 212 for the "From" field of a SIP header. A destination identifier 206 associated with the third communication device 102(3) may be used to determine a communication parameter 212 for the "To" field of the SIP header. Similarly, other communication parameters 212 determined from the request 110 may be used to determine communication parameters 212 for a "Request-Line-URI" field, a "Via" field, a "Contact" field, an "Allow" field, other fields within the SIP header, and so forth. The SIP invitation 510 containing the determined communication parameters 212 may be provided to the third communication device 102(3). The third communication device 102(3) may accept the SIP invitation 510 to establish the SIP connection 512. The SIP connection 512 or a RTP connection between the load balancing device 104 and the third communication device 102(3) may be used to provide data to and receive data from the third communication device 102(3).

Figure 6:
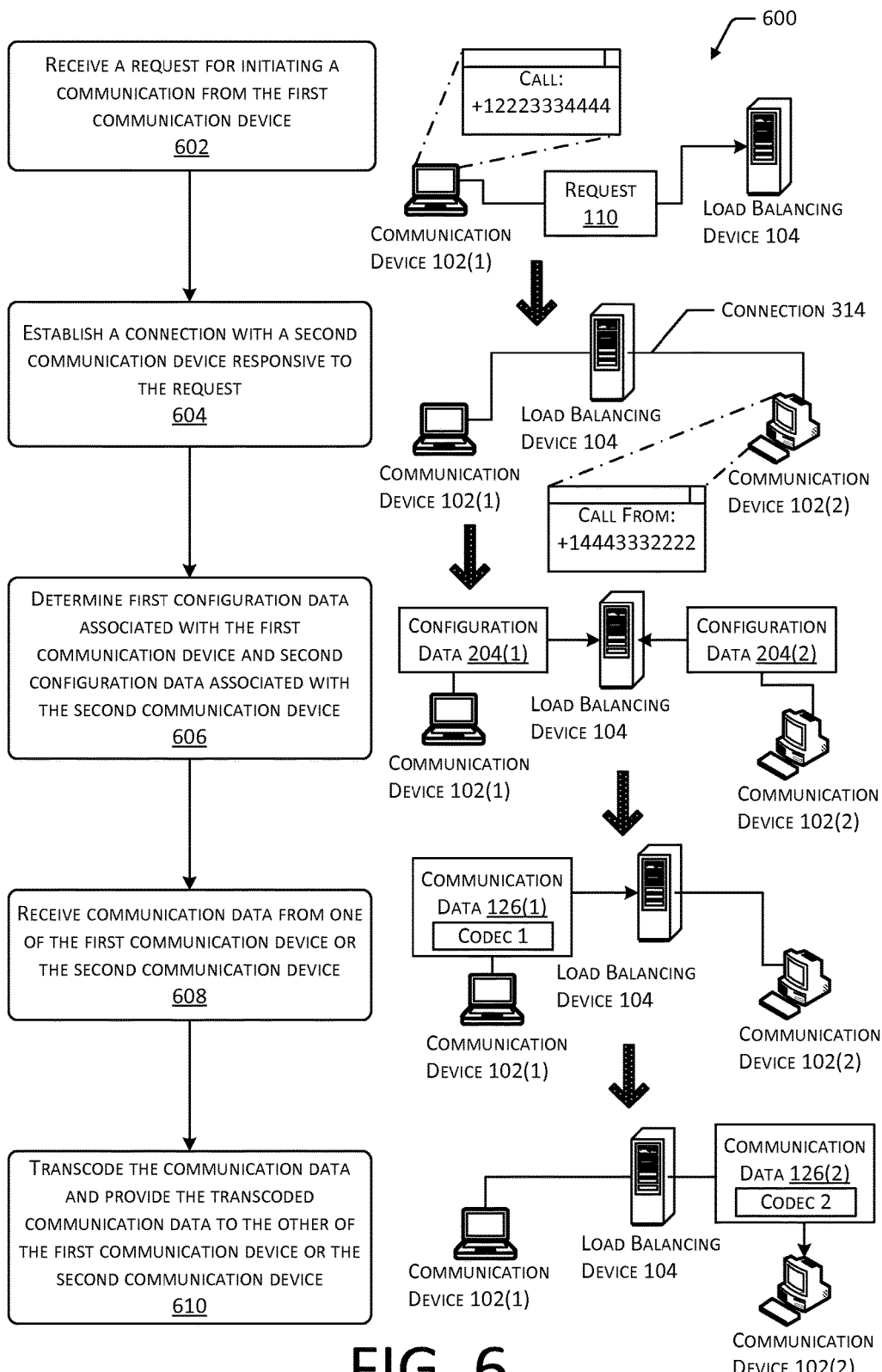
FIG. 6 illustrates a method for determining configuration data from communication devices and transcoding communication data received from the communication devices.

FIG. 6 illustrates a method 600 for determining configuration data 204 from communication devices 102 and transcoding communication data 126 received from the communication devices 102. At 602, a request 110 for initiating a communication may be received from a first communication device 102(1). As described previously, the first communication device 102(1) may provide the request 110 to a load balancing device 104, which may determine communication parameters 212 based on request terms 208 within the request 110. The load balancing device 104 may also access connection data 120 to determine one or more types of connections 314 that may be used to establish communication with a second communication device 102(2).

At 604, the load balancing device 104 may establish a connection 314 with a second communication device 102(2) responsive to the request 110. The connection 314 may include one or more of a HTTP connection, a websocket connection 410, a SIP connection 512, a RTP connection, or other types of connections. In some implementations, the nature of the connection 314 may be determined based on the connection data 120 or configuration data 204 associated with one or more of the first communication device 102(1) or the second communication device 102(2). For example, if the second communication device 102(2) is associated with a telephone network 112, the connection 314 may include one or more of a SIP connection 512 or a RTP connection established with one or more devices within the telephone network 112, such as a SBC 122. In some implementations, the second communication device 102(2) may constitute the endpoint of the SIP or RTP connection 512. For example, the second communication device 102(2) may include a VoIP telephone associated with a PBX. In other implementations, the second communication device 102(2) may be external to the telephone network 112, and data provided to the second communication device 102(2) may pass through an intermediate device associated with an endpoint of the SIP or RTP connection 512.

At 606, first configuration data 204(1) associated with the first communication device 102(1) and second configuration data 204(2) associated with the second communication device 102(2) may be determined by the load balancing device 104. The configuration data 204 may include one or more firewall settings, channels, ports, sockets, protocols, codecs, and so forth, associated with the communication devices 102. For example, the first communication device 102(1) may be configured to process communication data 126 using a first codec while the second communication device 102(2) is configured to process communication data 126 using a second codec that differs from the first codec. In a similar manner, the first communication device 102(1) and the second communication device 102(2) may communicate using different protocols, channels, and so forth.

At 608, the load balancing device 104 may receive communication data 126 from one of the first communication device 102(1) or the second communication device 102(2). The communication data 126 may include audio data, video data, and so forth. For example, the first communication device 102(1) may provide first communication data 126(1) that has been processed using a first codec to the load balancing device 104.

At 610, based on the configuration data 204(2) associated with the second communication device 102(2), the load balancing device 104 may transcode the first communication data 126(1) to form second communication data 126(2). For example, the second communication data 126(2) may be configured for use with a second codec associated with the second communication device 102(2). The transcoded communication data 126(2) may be provided from the load balancing device 104 to the second communication device 102(2) via one or more connections 314. The load balancing device 104 may also be configured to receive communication data 126 from the second communication device 102(2) and to transcode the communication data 126 in a manner corresponding to the configuration data 204(1) associated with the first communication device 102(1).

In some implementations, the first codec associated with the first communication device 102(1) and the second codec associated with the second communication device 102(2) may be identical. Other configurations may also be common between the first communication device 102(1) and the second communication device 102(2). For example, the load balancing device 104 may be configured to receive communication data 126 from a first communication device 102(1) and route the communication data 126 to a second communication device 102(2) without transcoding the communication data. Continuing the example, the first communication device 102(1) and the second communication device 102(2) may be associated with respective networks that prevent direct communication between the communication devices 102 (e.g., due to firewall settings associated with one or both networks). The load balancing device 104 may be permitted to access both networks and may therefore receive and transmit data from both communication devices 102 in the manner of a Traversal Using Relays around Network Address Translator (TURN) device.

Figure 7:
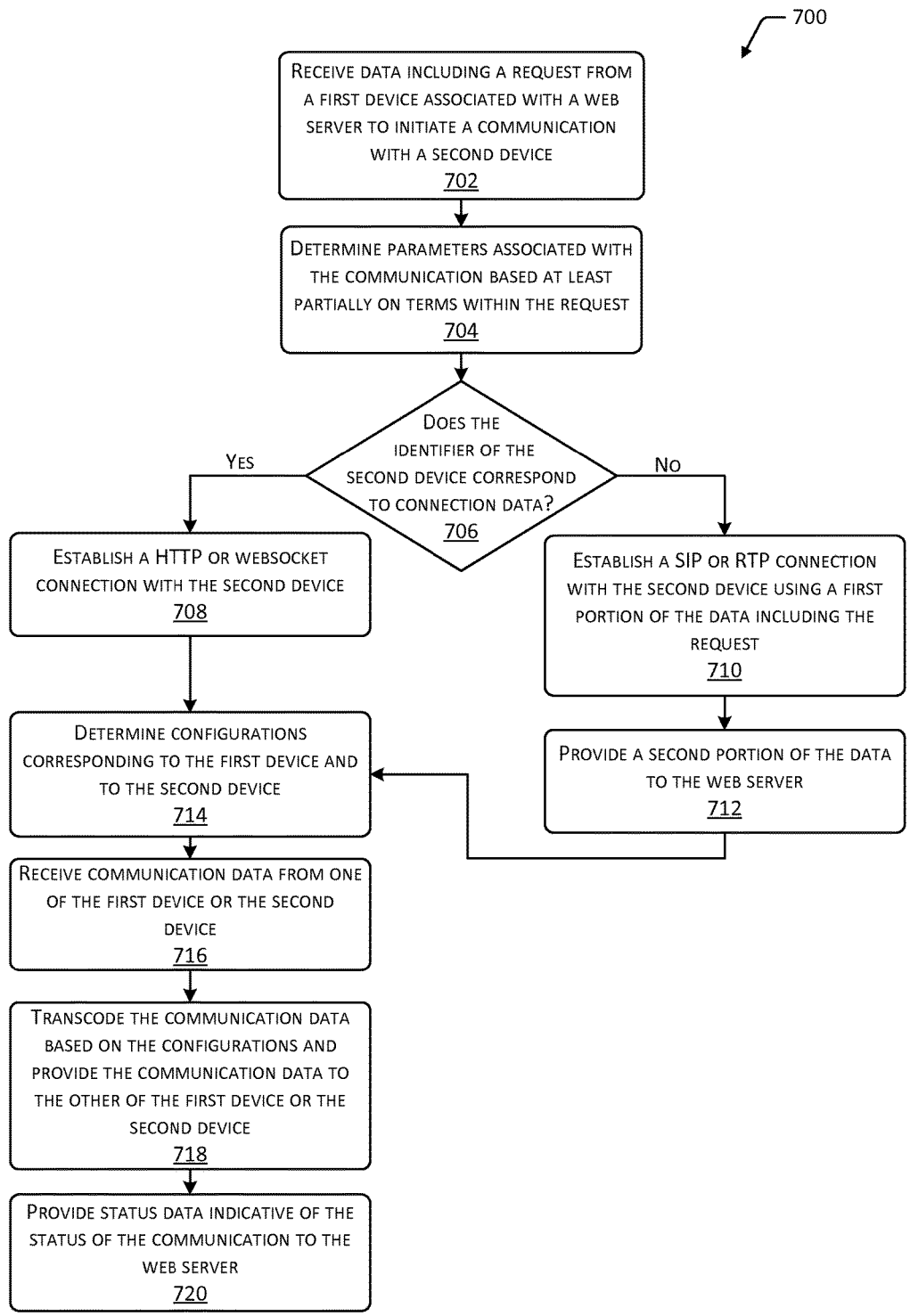
FIG. 7 is a flow diagram illustrating a method for establishing communication between communication devices.

FIG. 7 is a flow diagram 700 illustrating a method for establishing communication between communication devices 102. Block 702 receives data including a request 110 from a first device associated with a web server 106 to initiate a communication with a second device. For example, a first communication device 102(1) may include a computing device executing a browser-based API that may be used for outputting audio and video data using speakers and a display of the first communication device 102(1). The first communication device 102(1) may also be configured to receive audio and video data using a camera and microphone. In some implementations, the first communication device 102(1) may also be configured to receive alphanumeric data using a keyboard or touch sensor and to display received alphanumeric data. To generate a request 110, a user of the first communication device 102(1) may input a destination identifier 206 associated with a second communication device 102(2). The destination identifier 206 may include a name or address that identifies the second communication device 102(2) within a network, a telephone number, e-mail address, and so forth. In some implementations, a user of the first communication device 102(1) may input other communication parameters 212 when generating the request 110. For example, a user may select whether to initiate an audio or a video communication session, a preferred language, a type of connection, one or more display or sound settings, a message or other information to be communicated to the second communication device 102(2) concurrent with the request 110, and so forth. The data provided by the first communication device 102(1) may include other data in addition to the request 110. For example, web-based forms, graphical elements, and so forth, may be received concurrent with request terms 208 used to generate a SIP invitation 510. In some implementations, at least a portion of the other data may be provided to the web server 106 as request data 134.

Block 704 determines parameters associated with the communication based at least partially on terms within the request 110. For example, a request module 114 may access parameter data 116, which may include a map, table, list, database, or another type of data structure in which one or more request terms 208 may be associated with one or more communication parameters 212. By determining the presence of one or more request terms 208 in the request 110, the request module 114 may differentiate the portions of the received data that correspond to the request 110 from other data. Web data 108 (e.g., data from which no request terms 208 are determined, such as network traffic) may be passed to the web server 106. In some implementations, portions of the request 110 that do not correspond to parameter data 116 may be provided to the web server 106 as request data 134. Continuing the example, a first request term 208(1) may be associated with a communication parameter 212 for creating a communication session. A second request term 208(2) may be associated with a communication parameter 212 for adding the second communication device 102(2) as a participant in the communication session. Additional request terms 208 may be associated with communication parameters 212 that populate fields within a SIP invitation 510 or similar data provided to a user of the second communication device 102(2). Additional request terms 208 may also be associated with one or more connection types 216, configurations associated with one or both communication devices 102, configurations associated with the connection 314, configurations associated with the communication session, and so forth.

Block 706 determines whether the identifier associated with the second device corresponds to connection data 120. As described previously, the request 110 may include a destination identifier 206 associated with the second communication device 102(2). The connection data 120 may include a list of identifiers indicative of communication devices 102 accessible to a load balancing device 104 via a HTTP or websocket connection 410. In other implementations, the connection data 120 may include a list of identifiers indicative of communication devices 102 accessible via other types of connections, such as SIP or RTP connections 512. The presence or absence of the destination identifier 206 associated with the request 110 within the connection data 120 may determine the type of connection established with the second communication device 102(2).

If the destination identifier 206 of the second communication device 102(2) corresponds to the connection data 120, block 708 may establish a HTTP or websocket connection 410 with the second communication device 102(2). For example, the connection data 120 may include a state table indicating one or more communication devices 102 having an open or available HTTP or websocket connection 410 with the load balancing device 104. Correspondence between the connection data 120 and the destination identifier 206 of the request 110 may indicate that the second communication device 102(2) may be accessed via a HTTP or websocket connection 410.

If the destination identifier 206 of the second communication device 102(2) does not correspond to the connection data 120, block 710 may establish a SIP or RTP connection 512 with the second communication device 102(2) using a first portion of the data including the request 110. For example, the second communication device 102(2) may include a telephone or video conferencing device associated with a telephone network 112. One or more of a SIP connection 512 or a RTP connection may be established with a device associated with the telephone network 112 to enable communication with the second communication device 102(2). Portions of the data received from the first communication device 102(1) that correspond to request terms 208 may be used to generate a SIP invitation 510, indicate parameters of a SIP connection 512, and so forth.

Block 712 may provide a second portion of the data received from the first communication device 102(1) to a web server 106 as request data 134. For example, the first portion of the data received from the first communication device 102(1) may include request terms 208 that may correspond to communication parameters 212. The communication parameters 212 may be used to generate a SIP invitation 510. A second portion of the data that does not correspond to communication parameters 212 (e.g., request data 134) may include text, graphical elements, and so forth, relating to the connection. The data that is not used to establish a connection between communication devices 102 may be provided to the web server 106 as request data 134. In some implementations, the portions of the request 110 that are used to establish the connection 314 may also be provided to the web server 106 to indicate the establishment of the connection 314, the connection types 216, the communication devices 102 associated with the connection 314, and so forth.

Block 714 determines configurations corresponding to the first device and to the second device. For example, the first communication device 102(1) and the second communication device 102(2) may each communicate using different ports or channels, may each be associated with different firewall settings, may each communicate using different protocols or codecs, and so forth. Configuration data 204 corresponding to communication devices 102 may be determined from the request 110, queried from or provided by the communication devices 102, or stored in association with the load balancing device 104. The configuration data 204 may be used to determine the manner in which communication data 126 received from each communication device 102 is transcoded prior to providing the communication data 126 to other communication devices 102.

Block 716 receives communication data 126 from one of the first device or the second device. For example, either the first communication device 102(1) or the second communication device 102(2) may provide communication data 126 to the load balancing device 104. A transcoding module 124 may access the configuration data 204 associated with the other communication device 102 to determine protocols, codecs, and so forth, that the other communication device 102 may successfully utilize. Block 718 transcodes the communication data 126 based on the configuration(s) and provides the communication data 126 to the other of the first communication device 102(1) or the second communication device 102(2). The transcoding module 124 may transcode the communication data 126 and provide the communication data 126 to the other communication device 102 in a manner that corresponds to the configuration data 204 (e.g., via certain channels, ports, and so forth). Similarly, communication data 126 received from the other communication device 102 may be transcoded and provided to the original communication device 102, based on the determined configuration data 204.

Block 720 provides status data 132 indicative of the status of the communication to the web server 106. For example, the web server 106 may query the load balancing device 104 to determine a status of one or more connections, communications, communication devices 102, processes executed by the load balancing device 104 or communication devices 102 (e.g., browser-based interfaces), and so forth. The load balancing device 104 may provide status data 132 to the web server 106 responsive to the query. In some implementations, the load balancing device 104 may be configured to periodically or continuously provide status data 132 to the web server 106. In other implementations, the status data 132 may include data indicative of one or more previous communications. For example, the status data 132 may include historical or aggregated data indicative of communications that were successfully initiated, communications where initiation was unsuccessful, a length of one or more communications, a current or previous state of one or more communications, and so forth. A status module 130 associated with the load balancing device 104 may determine status data 132 from communication devices 102, and may store the status data 132 in a manner that enables the determination of metric information regarding previous communications.

Figure 8:
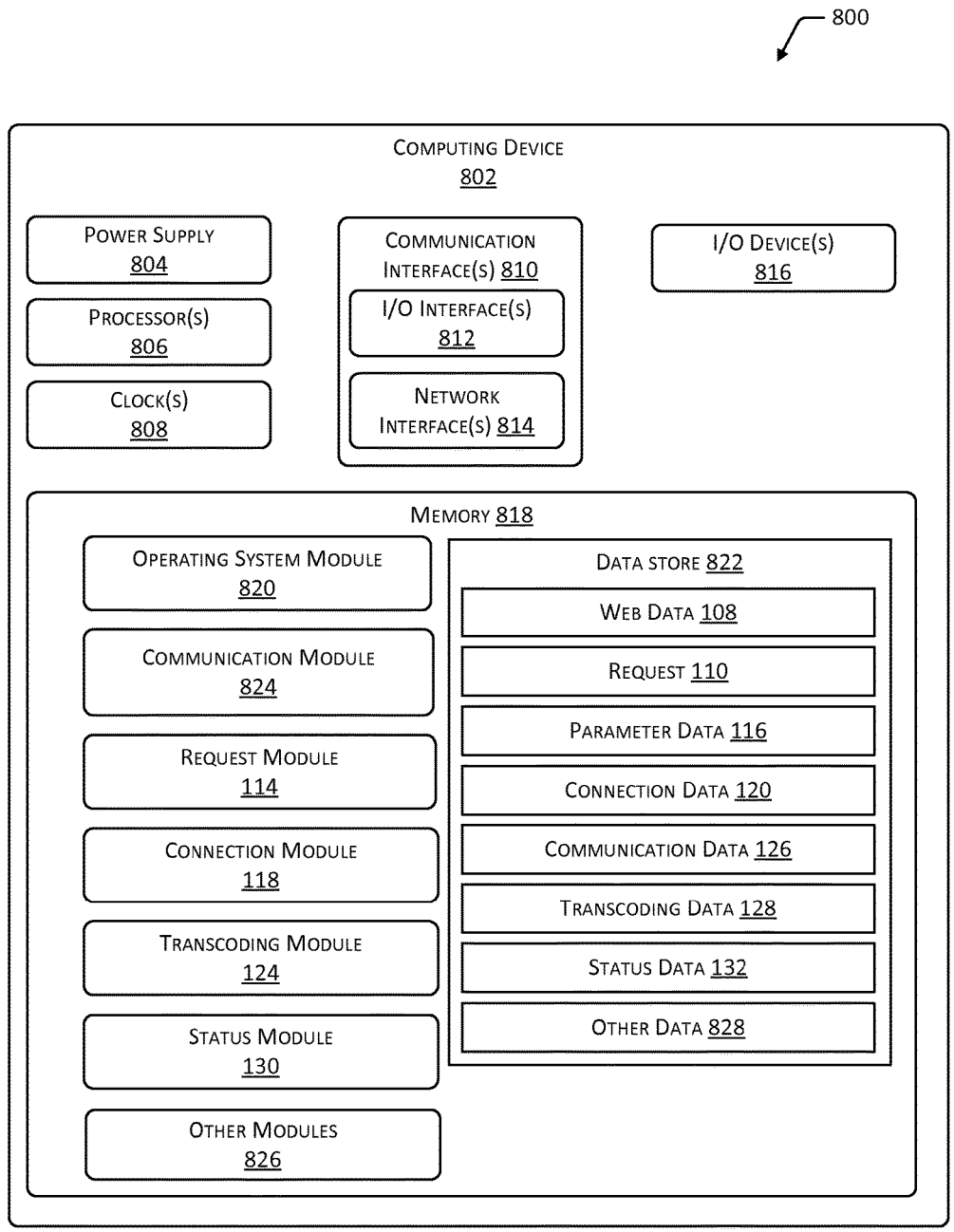
FIG. 8 is a block diagram illustrating a computing device within the scope of the present disclosure.

FIG. 8 is a block diagram 800 of a computing device 802 configured to support operation of the system 100. The computing device 802 may include one or more communication devices 102, load balancing devices 104, web servers 106, SBCs 122, or other servers or computing devices 802 in communication with one or more communication devices 102 or load balancing devices 104.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input devices or output devices associated with a communication device 102, load balancing device 104, or other computing device 802. For example, I/O devices 816 may include input devices, such as touch sensors, keyboards, mouse devices, microphones, and so forth. I/O devices 816 may also include output devices, such as speakers, displays, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs, wide area networks (WANs), wireless WANs, telephone networks 112, and so forth. For example, the network interfaces 814 may include devices compatible with Ethernet, Wi-Fi®, Bluetooth®, ZigBee®, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 may be configured to establish communications with one or more other computing devices 802, such communication devices 102, load balancing devices 104, web servers 106, SBCs 122 and other network elements, or other computing devices 802 in communication therewith. The communications may be authenticated, encrypted, and so forth. In some implementations, the communication module 824 may establish HTTP or websocket connections 410, SIP connections 512, RTP connections, or other types of connections, with other computing devices 802 associated with other networks. The communication module 824 may include audio and video data processing components for converting audio and video input received from one or more of the I/O devices 816 to communication data 126.

The memory 818 may also store the request module 114. The request module 114 may receive data from communication devices 102, which may include web data 108 or one or more requests 110. The request module 114 may determine correspondence between the received data and parameter data 116 stored in the data store 822. If a lack of correspondence between the received data and the parameter data 116 is determined, this determination may indicate that the received data is web data 108, which may be provided to the web server 106 or to one or more communication devices 102. If correspondence between the received data and the parameter data 116 is determined, this determination may indicate that the received data is a request 110 to initiate a communication. The request module 114 may further determine communication parameters 212 from the request 110 by determining correspondence between request terms 208 of the request 110 and request terms 208 of the parameter data 116. One or more request terms 208 of the parameter data 116 may be associated with corresponding communication parameters 212. The parameter data 116 may therefore be used to map received request terms 208 of the request 110 to corresponding communication parameters 212.

The memory 818 may additionally store the connection module 118. The connection module 118 may determine correspondence between the request 110 and connection data 120. The request 110 may include one or more identifiers associated with one or more communication devices 102. The connection data 120 may include a list, table, database, or other data structure indicating one or more communication devices 102 accessible via a HTTP or websocket connection 410, or other types of connections. If correspondence between an identifier within the request 110 and the connection data 120 is determined, the connection module 118 may cause a HTTP or websocket connection 410 to be established with the communication device 102 associated with the identifier. If a lack of correspondence between the identifier and the connection data 120 is determined, the connection module 118 may cause a SIP or RTP connection 512 to be established to communicate with the communication device 102 associated with the identifier. In some implementations, the connection module 118 may access the determined communication parameters 212 for use establishing connections with communication devices 102. For example, one or more communication parameters 212 may be used to generate a SIP invitation 510.

The memory 818 may further store the transcoding module 124. The transcoding module 124 may determine configurations (e.g., SDPs, protocols, codecs, etc.) associated with one or more communication devices 102. Based on the determined configurations, the transcoding module 124 may transcode communication data 126 received from a first communication device 102(1), and provide the transcoded communication data 126 to one or more other communication devices 102. The transcoding module 124 may access transcoding data 128 indicative of the manner in which communication data 126 may be modified or processed based on one or more configurations.

The memory 818 may store the status module 130, which may be used to provide status data 132 to a web server 106 or one or more other computing devices 802. The status module 130 may provide status data 132 responsive to a query from a computing device 802. In other implementations, the status module 130 may provide status data 132 to one or more computing devices 802 on a periodic or continuous basis. The status module 130 may also determine status data 132 from one or more communication devices 102 or other computing devices 802 and store the status data 132 for subsequent use. For example, stored status data 132 may be used to determine metric information regarding one or more communications, types of communications, devices, types of devices, and so forth. Metric information may be used to analyze, maintain, or repair one or more networks or devices.

Other modules 826 may also be present in the memory 818. For example, encryption modules may be used to encrypt and decrypt communications between computing devices 802. Network determination modules may determine available networks by which communications may be initiated, a current state of one or more communication devices 102, current configurations of one or more communication devices 102, and so forth. User interface modules may provide communication data 126, web data 108, or status data 132 to one or more users of communication devices 102 or load balancing devices 104.

Other data 828 in the data store 822 may include user input data regarding configurations, settings, or preferences. Other data 828 may also include threshold values corresponding to the status data 132 that may be used to determine disruptions in one or more devices or connections, or encryption data that may be used to encrypt and decrypt communication data 126.

In different implementations, different computing devices 802 may have different capabilities or capacities. For example, a load balancing device 104 or web server 106 may have significantly more processor 806 capability and memory 818 capacity compared to the processor 806 capability and memory 818 capacity of a communication device 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a load balancing device in communication with a first device and a web server;
one or more memories storing computer-executable instructions; and
one or more hardware processors configured to execute the computer-executable instructions to:
receive a request from the first device to initiate a communication with a second device associated with a telephone network, wherein the request includes an identifier associated with the second device;
determine correspondence between at least a first portion of the request and parameter data indicative of parameters associated with communication requests, the correspondence indicating that the request received from the first device includes a communication request;
responsive to the correspondence, access connection data including identifiers associated with one or more devices in communication with the load balancing device;
determine a lack of correspondence between the identifier associated with the second device and the connection data;
establish one or more of a Session Initiation Protocol (SIP) connection or a Real-time Transport Protocol (RTP) connection with the telephone network based at least partially on the lack of correspondence between the identifier associated with the second device and the connection data;
determine a first protocol associated with the first device and a second protocol associated with the second device;
receive first communication data from the first device, wherein the first communication data utilizes the first protocol;
transcode the first communication data to form second communication data, wherein the second communication data utilizes the second protocol;
provide the second communication data to the second device via the one or more of the SIP connection or the RTP connection;
receive third communication data from the second device, wherein the third communication data utilizes the second protocol;
transcode the third communication data to form fourth communication data, wherein the fourth communication data utilizes the first protocol; and
provide the fourth communication data to the first device.

2. The system of claim 1, wherein the computer-executable instructions to establish the one or more of the SIP connection or the RTP connection with the telephone network further comprise computer-executable instructions to:
based on the correspondence between the at least a first portion of the request and the parameter data, determine at least one parameter associated with the communication;
generate a SIP invitation including the at least one parameter;
provide the SIP invitation to the telephone network;
receive a response accepting the SIP invitation from the telephone network;
determine a lack of correspondence between a second portion of the request and the parameters associated with the communication; and
provide the second portion of the request to the web server.

3. The system of claim 1, further comprising computer-executable instructions to:
determine a first configuration of the first device, wherein the first configuration includes an indication of one or more first codecs;
determine a second configuration of the second device, wherein the second configuration includes an indication of one or more second codecs;
wherein the computer-executable instructions for providing the second communication data include computer-executable instructions to:
provide the second communication data using the second configuration; and
wherein the computer-executable instructions for providing the fourth communication data include computer-executable instructions to:
provide the fourth communication data using the first configuration.

4. The system of claim 1, further comprising computer-executable instructions to:
determine status data associated with the one or more of the SIP connection or the RTP connection; and
provide at least a portion of the status data to the web server.

5. A method comprising:
receiving a request from a first device to initiate a communication with a second device, wherein at least one of the first device or the second device is associated with a server, and wherein the request includes an identifier associated with the second device;
determining correspondence between at least a first portion of the request and parameter data indicative of one or more request parameters;
responsive to the correspondence, determining a network association of the second device, wherein the network association is indicative of one or more of the server or a telephone network associated with the second device;
establishing a connection with the second device based at least partially on the network association;
receiving communication data from the first device;
determining a protocol associated with the second device; and
providing the communication data to the second device using the protocol.

6. The method of claim 5, wherein determining the network association of the second device comprises:
  accessing connection data including identifiers associated with one or more devices associated with the server; and
  determining correspondence between the identifier associated with the second device and the connection data;
  wherein establishing the connection with the second device includes:
    establishing one or more of a Hypertext Transfer Protocol (HTTP) connection or a websocket connection with the second device.

7. The method of claim 5, wherein determining the network association of the second device comprises:
  accessing connection data including identifiers associated with one or more devices associated with the server; and
  determining a lack of correspondence between the identifier associated with the second device and the connection data,
  wherein establishing the connection with the second device includes:
    establishing one or more of a SIP connection or a RTP connection with a network device associated with the telephone network for communication with the second device.

8. The method of claim 5, further comprising:
  based on the correspondence between the at least a first portion of the request and the parameter data, determining at least one parameter associated with the communication;
  wherein establishing the connection with the second device includes:
    generating a connection request indicative of the at least one parameter;
    providing the connection request to the second device; and
    receiving a response accepting the connection request.

9. The method of claim 5, wherein the first device is associated with the server and the second device is associated with the telephone network, the method further including:
  based on the correspondence between the at least a first portion of the request and the parameter data, determining at least one parameter associated with the communication;
  wherein establishing the connection with the second device includes:
    generating a SIP invitation including the at least one parameter;
    providing the SIP invitation to the telephone network; and
    receiving a response accepting the SIP invitation from the telephone network.

10. The method of claim 5, wherein the first device is associated with the telephone network and the second device is associated with the server, the method further comprising:
  accessing first parameters associated with a first protocol corresponding to the server and second parameters associated with a second protocol corresponding to the telephone network;
  determining correspondence between the request and the second parameters; and
  determining at least a subset of the first parameters based on the correspondence between the request and the second parameters;
  wherein establishing the connection with the second device includes providing the connection with the at least the subset of the first parameters.

11. The method of claim 5, further comprising:
  determining first configuration data corresponding to the first device;
  providing the first configuration data to the second device via the connection;
  requesting second configuration data from the second device; and
  receiving the second configuration data from the second device via the connection;
  wherein providing the communication data to the second device includes providing the communication data using at least a portion of the second configuration data.

12. The method of claim 5, further comprising:
  determining status data associated with one or more of the first device or the second device, wherein the status data is indicative of a status of one or more communications; and
  providing at least a portion of the status data to the server.

13. The method of claim 5, further comprising:
  determining at least one parameter based on the correspondence between the at least a first portion of the request and the parameter data, wherein the establishing of the connection is based at least partially on the at least one parameter;
  determining a lack of correspondence between a second portion of the request and the at least one parameter; and
  providing the second portion of the request to the web server.

14. A system comprising:
  one or more memories storing computer-executable instructions; and
  one or more hardware processors configured to execute the computer-executable instructions to:
    receive a request from a first device to initiate a communication with a second device, wherein one of the first device or the second device is associated with a server and the other of the first device or the second device is associated with a telephone network;
    determine correspondence between at least a first portion of the request and parameter data indicative of one or more request parameters;
    responsive to the correspondence, access first parameters associated with a first protocol corresponding to the server and second parameters associated with a second protocol corresponding to the telephone network;
    determine, based on the request, one or more of the first parameters or the second parameters for establishing a connection between the first device and the second device;
    establish the connection between the first device and the second device, wherein the connection includes the one or more of the first parameters or the second parameters;
    receive first communication data corresponding to one of the first protocol or the second protocol from one of the first device or the second device;
    transcode the first communication data to form second communication data, wherein the second communication data corresponds to the other of the first protocol or the second protocol; and provide the second communication data to the other of the first device or the second device.

15. The system of claim 14, wherein the computer-executable instructions establish the connection between the first device and the second device further comprises the computer-executable instructions to:
   determine SIP header data from the request based at least partially on the one or more of the first parameters or the second parameters;
   generate a SIP invitation including the SIP header data;
   provide the SIP invitation to the telephone network; and
   receive a response accepting the SIP invitation from the telephone network.

16. The system of claim 14, further comprising computer-executable instructions to:
   determine first configuration data indicative of a first Session Description Protocol (SDP) corresponding to the first device; and
   determine second configuration data indicative of a second SDP corresponding to the second device;
   wherein the computer-executable instructions to provide the second communication data to the other of the first device or the second device include computer-executable instructions to:
      provide the second communication data corresponding to one of the first SDP or the second SDP.

17. The system of claim 14, further comprising computer-executable instructions to:
   determine a lack of correspondence between a second portion of the request and the parameter data; and
   provide the second portion of the request to a web server.

18. The system of claim 14, further comprising computer-executable instructions to:
   receive status data from the one of the first device or the second device associated with the server; and
   provide at least a portion of the status data to a web server.

19. The system of claim 14, wherein the request comprises an identifier associated with the second device, the system further comprising computer-executable instructions to:
   determine correspondence between the identifier associated with the second device and connection data including identifiers associated with one or more devices associated with the server; and
   determine a connection type based at least partially on the correspondence between the identifier associated with the second device and the connection data,
   wherein the connection includes the connection type.

20. The system of claim 14, further comprising computer-executable instructions to:
   receive a request from one or more of the first device or the second device to initiate a communication with a third device, wherein the request includes an identifier associated with the third device;
   determine correspondence between the identifier associated with the third device and connection data including identifiers associated with one or more devices associated with the server;
   access a multipoint control unit (MCU); and
   establish a connection with the third device based at least partially on the correspondence between the identifier associated with the third device and the connection data.

* * * * *